United States Patent [19]

Arita et al.

[11] Patent Number: 5,440,213
[45] Date of Patent: Aug. 8, 1995

[54] COLLISION DETECTING METHOD USING AN OBSERVER

[75] Inventors: Soichi Arita; Tetsuaki Kato; Osamu Yoshida, all of Oshino, Japan

[73] Assignee: Fanuc, Ltd., Yamanashi, Japan

[21] Appl. No.: 177,342

[22] Filed: Jan. 4, 1994

Related U.S. Application Data

[60] Division of Ser. No. 46,896, Apr. 15, 1993, Pat. No. 5,304,906, which is a continuation of Ser. No. 752,648, filed as PCT/JP90/01692, Dec. 25, 1990, abandoned.

[30] Foreign Application Priority Data

Dec. 26, 1989 [JP] Japan ................................ 1-334967

[51] Int. Cl.$^6$ ................................................ G05B 5/00
[52] U.S. Cl. ........................... 318/568.11; 318/616; 318/618; 318/561
[58] Field of Search .......................... 318/560–649; 364/461, 474, 559, 151, 565; 395/80–99; 901/3, 7, 9, 15, 18, 16

[56] References Cited

U.S. PATENT DOCUMENTS

| | | | |
|---|---|---|---|
| 4,644,237 | 2/1987 | Frushour et al. | 318/587 |
| 4,680,518 | 7/1987 | Kurakake et al. | 318/561 |
| 4,695,780 | 9/1987 | Kurakake et al. | 318/561 |
| 4,851,754 | 7/1989 | Sakamoto et al. | 318/616 |
| 4,890,046 | 12/1989 | Kurakake et al. | 318/630 |
| 4,916,375 | 4/1990 | Kurakake et al. | 318/630 |
| 4,922,430 | 5/1990 | Wavish | 364/461 |
| 4,943,759 | 7/1990 | Sakamoto et al. | 318/568.11 |
| 4,958,114 | 9/1990 | Ogawa | 318/616 |
| 4,967,128 | 10/1990 | Sawai et al. | 318/609 |
| 4,986,150 | 1/1991 | Okazaki | 318/561 X |
| 4,992,715 | 2/1991 | Nakamura et al. | 318/649 |
| 4,994,979 | 2/1991 | Bruder et al. | 364/474.09 |
| 5,047,916 | 9/1991 | Kendo | 364/513 X |
| 5,079,713 | 1/1992 | Kawamura et al. | 364/474.2 |
| 5,091,683 | 2/1992 | Shimada | 318/561 |
| 5,091,684 | 2/1992 | Iwashita | 318/616 |
| 5,101,145 | 3/1992 | Rehm | 318/432 |
| 5,115,418 | 5/1992 | Shimada | 318/616 |
| 5,119,006 | 6/1992 | Torii et al. | 318/640 |
| 5,138,564 | 8/1992 | de Jong et al. | 364/571.04 |
| 5,214,362 | 5/1993 | Torii et al. | 318/567 |
| 5,239,248 | 8/1993 | Shimada et al. | 318/568.12 |

FOREIGN PATENT DOCUMENTS

| | | |
|---|---|---|
| 0321579 | 6/1989 | European Pat. Off. |
| 1-230107 | 9/1989 | Japan |
| 1-291682 | 11/1989 | Japan |

*Primary Examiner*—Paul Ip
*Attorney, Agent, or Firm*—Staas & Halsey

[57] ABSTRACT

A collision detecting method for quickly securely detecting a collision between a driven body driven by a servomotor and an obstacle by using an observer, thereby preventing machine components from be damaged by the collision. An estimated disturbance torque (y) is obtained in accordance with a torque command (I) and an actual motor speed ($\dot{\theta}$) by means of the observer (50) formed of blocks (S1 to 54) having transfer functions (Kt/J, K3, K4/S, 1/S), which depend individually on a torque constant, inertia, and parameters corresponding thereto, and a multiplier (61) having a transfer function (J·A) equivalent to the product of the inertia and a unit system conversion constant. The drive of the servomotor is stopped before any of the components of the machine is broken, in response to an alarm delivered from a comparator (62) when the estimated disturbance torque exceeds a threshold value (Ts) which is set at a value smaller than servomotor output torques corresponding to the breaking limits of the machine components.

5 Claims, 3 Drawing Sheets

COLLISION DETECTING METHOD USING AN OBSERVER

This application is a division of application Ser. No. 08/046,896, filed Apr. 15, 1993, now U.S. Pat. No. 5,304,906, which is a continuation of U.S. Ser. No. 07/752,648, filed Aug. 23, 1991, now abandoned.

BACKGROUND OF THE INVENTION

1. Field of the Invention

The present invention relates to a collision detecting method capable of quickly securely detecting a collision between a driven body driven by means of a servomotor and an obstacle by using an observer.

2. Description of the Related Art

During the operation of a robot, machine tool, etc., a machine operating section, such as a robot arm and a machine table, or a workpiece mounted on the table sometimes may run against an obstacle, e.g., a foreign matter intruded in an operating region of a driven body. In a machine which uses a servomotor as a drive source, in such a case, the servomotor continues to produce a great output torque to move the driven body to a command position even after the driven body, having run against the obstacle, is stopped from moving. In some cases, therefore, machine components including the servomotor may be damaged, or a secondary accident may be caused. Conventionally, in order to avoid such an awkward situation, occurrence of a collision is detected by various methods, and the rotation of the motor is stopped when a collision occurs, As is generally known, a collision between the driven body and the obstacle may be detected by using a touch sensor mounted on the outer surface of the driven body, for example. Mounting this sensor, however, entails an increase in cost of the machine, and a collision between the driven body and the obstacle in any other position than the operating region of the sensor cannot be detected. In the machine whose driven body is driven by means of the servomotor, moreover, it is a known method to detect occurrence of a collision when a predetermined value is exceeded by a servomotor driving current which increases when the driven body and the obstacle run against each other. It takes a lot of time, however, for the servomotor driving current to actually attain the predetermined value after the occurrence of the collision, so that a detection delay is caused, and the resulting damage is substantial. It is also common knowledge that an alarm may be given after discriminating occurrence of a collision when an unreasonable value exceeding an allowable value is reached by the difference (positional deviation) between the command position and the actual position of the driven body. However, some of the machine components may be damaged before the allowable value is exceeded by the positional deviation after the occurrence of the collision.

Accordingly, a method for quickly detecting occurrence of a collision has been proposed in which the occurrence of the collision is discriminated or detected when a threshold value is exceeded by a differential value of a speed deviation or a differential value of a torque command value (see Japanese Patent Application No. 6332866). If a collision is caused while a servomotor whose speed command itself assumes a small value is rotating at low speed, however, the speed deviation, which depends on the speed command and the actual speed, increases relatively slowly, so that the differential value of the speed deviation and the differential value of the torque command corresponding thereto are not very large values. In order to detect the occurrence of a collision quickly, therefore, the threshold value should be set at a small value. In this case, the occurrence of a collision is liable to be wrongly discriminated in a normal rotating speed range although no collision is caused.

DISCLOSURE OF THE INVENTION

The object of the present invention is to provide a collision detecting method capable of quickly securely detecting a collision between a driven body driven by means of a servomotor and an obstacle by using an observer, thereby preventing machine components from being damaged by the collision.

In order to achieve the above object, according to the present invention, there is provided a collision detecting method for use in a machine in which a driven body is driven by means of a servomotor which in turn is controlled by means of a servo system. This collision detecting method comprises a process for estimating the magnitude of a disturbance acting on the servo system by means of an observer, and a process for discriminating a collision of the driven body with an obstacle when a preset threshold value is exceeded by the magnitude of the disturbance thus estimated.

According to the present invention, as described above, the collision of the driven body with the obstacle is discriminated when the preset threshold value is exceeded by the magnitude of the disturbance estimated by means of the observer, so that occurrence of a collision can be quickly securely detected even during low-speed operation of the servomotor, and components of the machine can be prevented from being damaged by the collision.

DESCRIPTION OF THE EMBODIMENT

Figure 2:
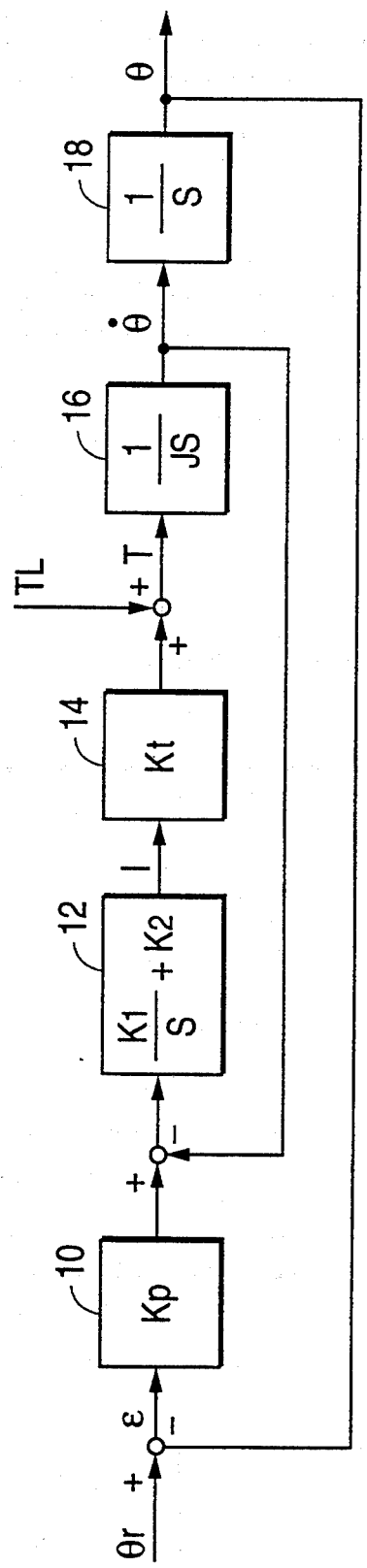
FIG. 2 is a block diagram showing a servo system for use with the observer of FIG. 1.

A machine (not shown) to which a collision detecting method according to one embodiment of the present invention is applied comprises one or more servomotors for driving a driven body. A servo system for controlling its corresponding one of the servomotors, as exemplarily illustrated in FIG. 2, comprises a first block 10 for generating a speed command by multiplying the difference (positional deviation) $\epsilon$ between a position command $\theta r$ delivered from a numerical control device or the like and an actual position $\theta$ by a proportional gain Kp, and a second block 12 for determining a motor driving current (torque command) I by effecting proportional-plus-integral control using an integral constant K1 and a proportional constant K2 on the basis of the difference (speed deviation) between the speed command and an actual speed $\dot{\theta}$. In other words, the servo system includes a position loop for proportional control and a speed loop which serves as a minor loop of the position loop and for the proportional-plus-integral control. Further, the servo system is arranged to supply the driving current I to servomotors represented by third and fourth blocks 14 and 16, thereby rotating the motors at a speed $\dot{\theta}$. A fifth block 18 represents a pulse coder or the like for detecting the actual motor rotating speed $\dot{\theta}$. The actual motor rotating speed $\dot{\theta}$ is detected on the basis of the output of the pulse coder, for example. In FIG. 2, symbols Kt and J designate the torque constant and inertia of the servomotor, respectively, and T and TL designate the output torque of the servomotor and a disturbance torque, respectively.

In order to effect the collision detecting method of the present embodiment, an apparatus is employed with an observer for estimating the disturbance torque TL and means for stopping the drive of the servomotor when a threshold value is exceeded by the estimated disturbance torque. Preferably, as mentioned in detail later, the collision detecting apparatus is composed of a digital servo circuit which is arranged to achieve the respective functions of the position loop and the speed loop of FIG. 2, the observer, etc., on software processing basis.

The following is a description of the collision detecting apparatus.

Figure 3:
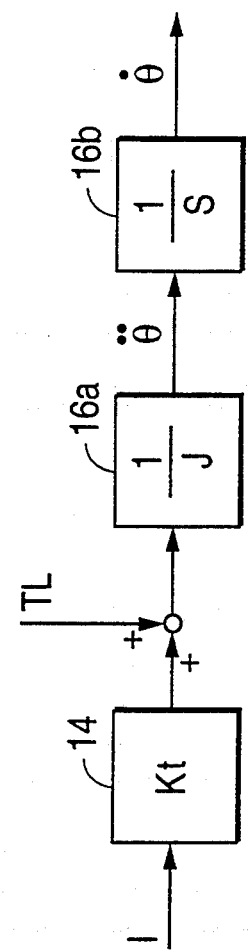
FIG. 3 is a block diagram showing that part of the servo system of FIG. 2 which is regarded as a subject for the arrangement of the observer.

FIG. 3 shows that part (model) of the servo system of FIG. 2 which is regarded as the subject for the arrangement of the observer. The model shown in FIG. 3 comprises a first block 14 corresponding to the third block 14 of FIG. 2, and second and third blocks 16a and 16b corresponding to the fourth block 16 of FIG. 2. If the disturbance torque TL does not change with the passage of time ($\dot{TL}=0$), a state equation given by equation (1) holds for the model shown In FIG. 3.

$$\begin{bmatrix} \ddot{\theta} \\ \dot{TL} \end{bmatrix} = \begin{bmatrix} 0 & 1/J \\ 0 & 0 \end{bmatrix} \begin{bmatrix} \dot{\theta} \\ TL \end{bmatrix} + \begin{bmatrix} Kt/J \\ 0 \end{bmatrix} I \quad (1)$$

Here $\ddot{\theta}$ represents the motor acceleration, and $\dot{\theta}$ and TL represent the motor speed and disturbance torque, respectively, as state variables. Further, I represents the torque command as an input, and Kt and J represent the torque constant and inertia of the motor, respectively. Symbol $\dot{TL}$ represents the changing rate of the disturbance torque.

Figure 1:
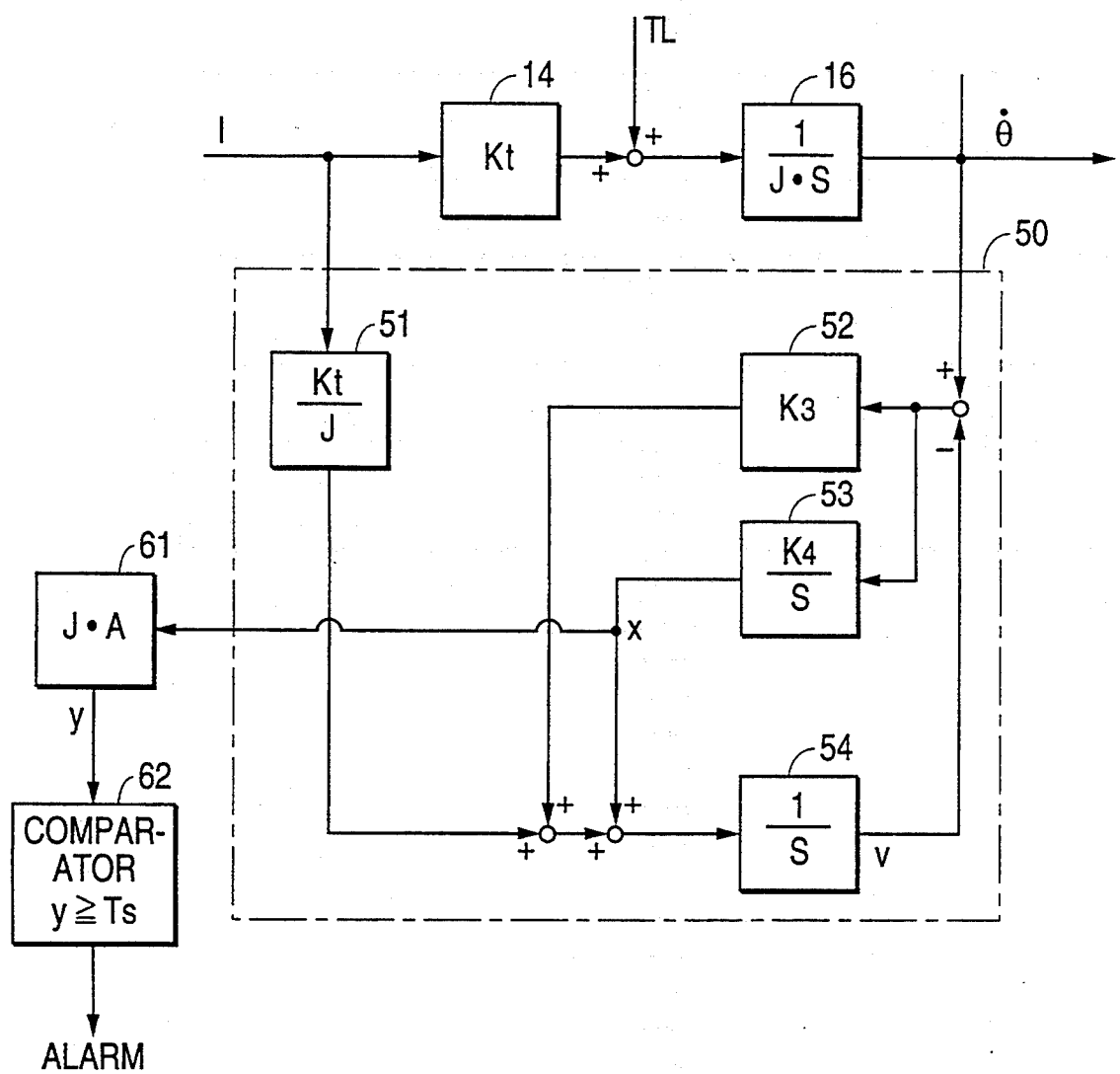
FIG. 1 is a block diagram showing an observer and Its peripheral elements for embodying a collision detecting method according to one embodiment of the present invention.

In light of equation (1), the observer for estimating the disturbance torque TL Is constructed in the manner shown in FIG. 1. The observer 50 of FIG. 1 comprises first to fourth blocks 51 to 54 whose transfer functions are Kt/J, K3, K4/S, and 1/S, respectively. In the observer 50, the sum of the output of the first block 51 which receives the torque command I, the output of the second block 52, and an output x of the third block 53 is supplied to the fourth block 54. Also, a deviation between the actual speed $\dot{\theta}0$ and an estimated speed v delivered from the fourth block 54 is supplied to each of the second and third blocks 52 and 53.

As seen from the block diagram shown in FIG. 1, the actual motor speed $\dot{\theta}$ and the estimated motor speed v are given by equations (2) and (3), respectively.

$$\dot{\theta}=(I\cdot Kt+TL)\cdot(1/J\cdot S), \quad (2)$$

$$v=\{I\cdot Kt/J+(\dot{\theta}-v)\cdot K3+(\dot{\theta}-v)\cdot(K4/S)\}\cdot(1/S). \quad (3)$$

From equation (2), we obtain $$I=(\dot{\theta}\cdot J\cdot S-TL)/Kt. \quad (4)$$

Substituting equation (4) into equation (3), we obtain $$v\cdot S=(\dot{\theta}\cdot J\cdot S-TL)/J+(\dot{\theta}-v)\cdot K3+(\dot{\theta}-v)\cdot(K4/S). \quad (5)$$

Rearranging equation (5), we obtain $$S(\dot{\theta}-v)+(\dot{\theta}v)\cdot K3+(\dot{\theta}-v)\cdot K4/S=TL/J. \quad (6)$$

From equation (6), we obtain equation (7) which is indicative of the deviation ($\dot{\theta}-v$) between the actual speed and the estimated speed. Further, the output x of the third block 53 of the observer 50 is given by equation (8).

$$\dot{\theta} - v = (TL/J) \cdot \{1/(S + K3 + K4/S)\} \quad (7)$$

$$\begin{aligned} x &= (\dot{\theta} - v) \cdot K4/S \\ &= (TL/J) \cdot \{K4/(S^2 + K3 \cdot S + K4)\}. \end{aligned} \quad (8)$$

If the respective transfer functions K3 and K4 of the second and third blocks 52 and 53 of the observer 50 are selected so that poles are stable in equation (8) the output x of the third block 53 of the observer 50 is substantially equal to a value obtained by dividing the disturbance torque TL by the inertia J.

$$x \approx TL/J. \quad (9)$$

The collision detecting apparatus comprises a multiplier 61 and a comparator 62 which cooperate with the multiplier to constitute part of the motor stopping means, besides the observer 50 constructed as aforesaid. In the multiplier 61, the output x of the third block 53 of the observer 50 is multiplied by the product of the inertia J and a conversion constant A for matching a unit system, whereby an estimated disturbance torque y ($\approx$TL) is obtained. In the comparator 62, moreover, the estimated disturbance torque y is compared with a threshold value Ts for collision detection discrimination. The comparator 62 is arranged to discriminate or detect the occurrence of a collision and deliver an alarm when it detects the estimated disturbance torque y equal to or greater than the threshold value Ts. The motor stopping means is arranged to stop the drive of the motor in response to the alarm, as mentioned later.

The threshold value Ts is set at a value smaller than the minimum value of motor output torques which correspond individually to the respective breaking limits of the various components of the machine, so that an alarm is given before any of the machine components is damaged when the driven body of the machine runs or collides against an obstacle even if the servomotor rotates at low speed. Also, the threshold value Ts is set at a value greater than the maximum value of motor output torques corresponding individually to a static frictional force produced in the machine, a reaction force produced by a spring system of the machine, and a gravity term which varies in dependence on the operating conditions of the machine. Accordingly, no alarm can be given as long as the machine is normally operated so that the motor output torques vary within a normal range.

Figure 4:
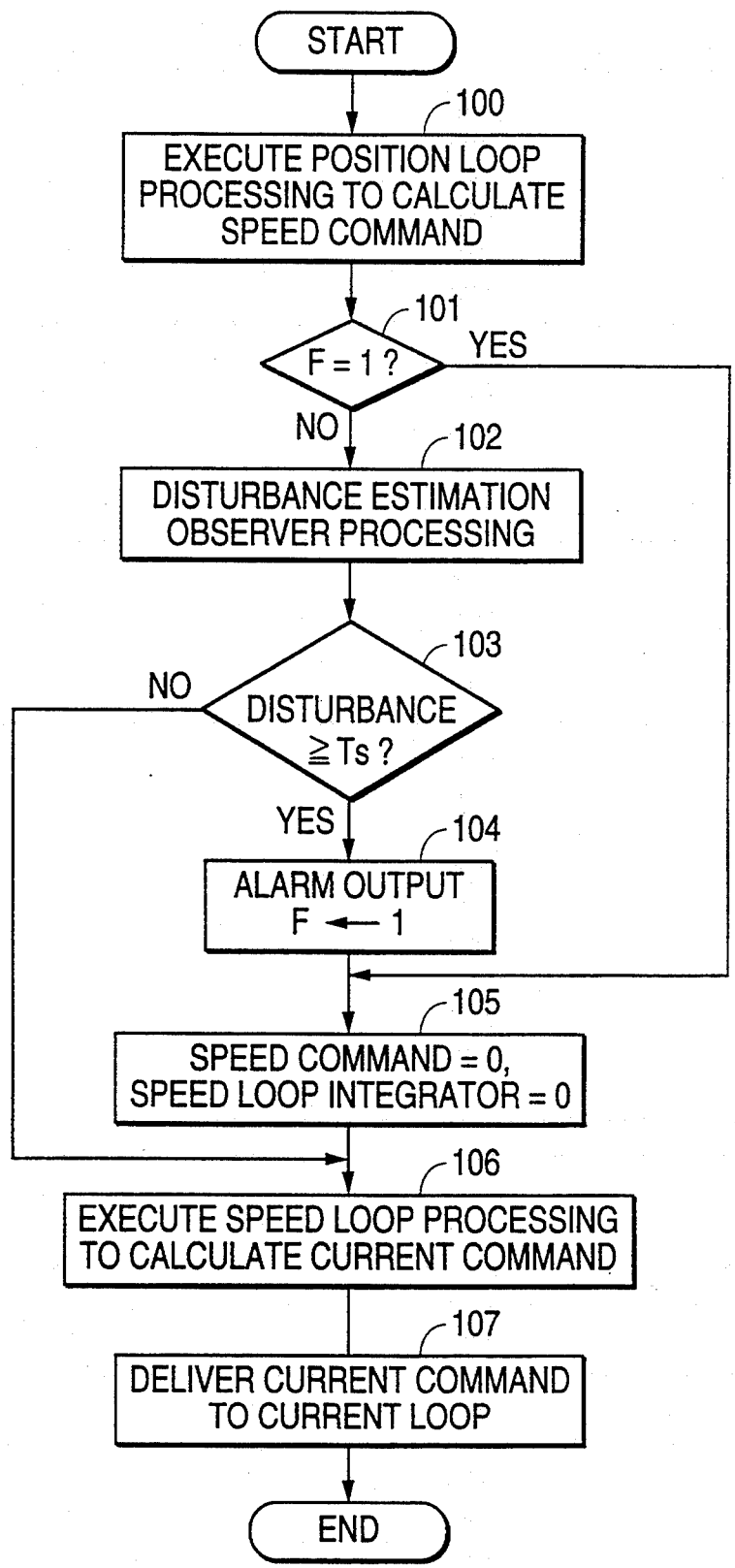
FIG. 4 is a flow chart showing processes executed by means of a digital servo circuit.

Referring now to FIG. 4, an explanation will be given as to the operation of the digital servo circuit (not shown), which has the functions of the position loop and the speed loop of the servo system of FIG. 2, the function of the observer 50, and the function of the motor stopping means which includes the multiplier 61 and the comparator 62.

A processor contained in the digital servo circuit cyclically executes the processes shown in FIG. 4. More specifically, in each processing cycle, the processor executes position loop processing in accordance with the position command θr delivered from the numerical control device and the actual position θ detected by means of the pulse coder, to thereby calculate the speed command (Step 100). Then, the processor determines whether or not a flag F is at the value "1" which is indicative of occurrence of a collision (Step 101). Here, the flag F is initially set at the value "0" which is indicative of nonoccurrence of a collision, so that the decision in Step 101 is negative. In this case, the processor executes software processing to fulfill the function of the observer 50. More specifically, the processor calculates the estimated speed v for the preceding processing cycle, that is, the speed obtained when the disturbance torque TL is not applied, in accordance with equation (3) and by using the known parameter values Kt, J, KS, and K4, the actual speed θ̇ detected in the preceding processing cycle, and the torque command I calculated by speed loop processing in the preceding processing cycle. Subsequently, the processor obtains an error (θ̇−v) between the actual speed for the preceding processing cycle and the estimated speed, and calculates a value corresponding to the third block output x of the observer 50 by using this calculation error and according to equation (8). In order to fulfill the function of the multiplier 61, moreover, the processor multiplies the calculated value x by a value J·A to obtain the estimated disturbance torque y (Step 102). Then, the processor determines whether or not the estimated disturbance torque y is equal to or greater than the threshold value Ts (Step 103). If the driven body normally moves without being hindered by an obstacle, that is, if the servomotor normally follows up the torque command I, the error (θ̇−v) between the actual speed and the estimated speed is small, and the estimated disturbance torque y takes a small value. If the driven body runs against an obstacle, on the other hand, the speed error (θ̇−v) and hence the estimated disturbance torque y take substantial values which indicate occurrence of a collision.

If it is concluded that the estimated disturbance torque X is smaller than the threshold value Ts, the processor executes the speed loop processing in accordance with the speed command and the actual speed θ̇, to thereby calculate a current command (torque command) I (Step 106), and delivers the calculated command I to the current loop (Step 107). Thereupon, the processes of FIG. 4 for the present processing cycle ends. As described above, the threshold value Ts is set at the value greater than the frictional force produced in the machine or the like. As long as the estimated disturbance torque y varies within the normal range, therefore, occurrence of a collision cannot be wrongly discriminated if there is no occurrence of a collision.

If it is concluded in Step 103 that the estimated disturbance torque y is equal to or greater than the threshold value Ts, on the other hand, the processor, discriminating or detecting occurrence of a collision, gives an alarm, and sets the flag F at the value "1" which is indicative of the occurrence of the collision (Step 104). Then, after resetting each of the value of the speed command calculated in Step 100 and a value In an integrator (not shown) of the speed loop at "0"(Step 105), the processor successively executes Step 106 for the current command calculation and Step 107 for the current command delivery. In each processing cycle on and after the collision detection, the decision in Step 101, which directly follows Step 100 for the speed command calculation, is positive, and Steps 105 to 107 are executed in succession. As a consequence, if occurrence of a collision is discriminated, the drive of the servomotor is quickly stopped before any of the various components of the machine are damaged. If an excessive load is applied to the servomotor, even though there is no occurrence of a collision, the drive of the motor is stopped in the same manner as in case of occurrence of a collision.

The present invention is not limited to the embodiment described above, and various modifications may be effected therein. For instance, although the present invention is effected by means of the digital servo circuit in the above-described embodiment, servo circuits of any other types may be used instead.

We claim:

1. A collision detecting method executed in a data processor for use in a machine in which a driven-body is driven by means of a servomotor controlled by a servo system, comprising the steps of:
   a) estimating a disturbance torque acting on the servo system using an observer means and a multiplier means based on the servomotor velocity information;
   b) comparing the disturbance torque estimated in said step a) with a threshold value and determining whether or not the estimated disturbance torque exceeds the threshold value;
   c) detecting a collision of the driven-body with an obstacle when the estimated disturbance torque exceeds the threshold value of step b); and
   d) stopping the servomotor for driving the driven-body when the collision is detected in said step c) for preventing further collisions.

2. A collision detecting method according to claim 1, wherein in said step a) said disturbance torque is estimated using the observer which is constructed in association with a speed loop of the servo system.

3. A collision detecting method according to claim 1, wherein said preset threshold value is set to a value smaller than a servomotor output torque corresponding to a breaking limit of a structural component of the machine.

4. A collision detecting method according to claim 1, wherein said preset threshold value is set to a value greater than a servomotor output torque produced during a normal operation of the machine.

5. A collision detecting method according to claim 1, wherein in said step a) estimating the disturbance is performed independent of a differential value of a speed deviation between an actual velocity and a desired velocity.

* * * * *